(12) United States Patent
Lof et al.

(10) Patent No.: US 9,375,791 B2
(45) Date of Patent: Jun. 28, 2016

(54) POLYGONAL TURNING INSERT

(71) Applicant: SANDVIK INTELLECTUAL PROPERTY AB, Sandviken (SE)

(72) Inventors: Ronnie Lof, Sandviken (SE); Erik Selin, Sandviken (SE); Joe Truong, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 343 days.

(21) Appl. No.: 14/219,288

(22) Filed: Mar. 19, 2014

(65) Prior Publication Data

US 2014/0286717 A1  Sep. 25, 2014

(30) Foreign Application Priority Data

Mar. 20, 2013  (SE) ..................................... 1350345

(51) Int. Cl.
*B23B 27/16* (2006.01)
*B23B 27/14* (2006.01)

(52) U.S. Cl.
CPC ............ *B23B 27/143* (2013.01); *B23B 2200/04* (2013.01); *B23B 2200/0447* (2013.01); *B23B 2200/081* (2013.01); *B23B 2200/201* (2013.01); *B23B 2200/321* (2013.01); *B23B 2200/323* (2013.01); *Y10T 407/235* (2015.01); *Y10T 407/24* (2015.01)

(58) Field of Classification Search
CPC ..................... B23B 2200/323; B23B 2200/04; B23B 2200/0447; B23B 2200/081; B23B 2200/201; B23B 2200/321
See application file for complete search history.

(56) References Cited

U.S. PATENT DOCUMENTS

| 5,372,463 | A | 12/1994 | Takahashi |
| 5,743,681 | A | 4/1998 | Wiman |
| 7,374,372 | B2 | 5/2008 | Rofner |
| 2011/0070040 | A1 | 3/2011 | Park et al. |
| 2013/0251468 | A1 | 9/2013 | Lof |
| 2013/0309028 | A1* | 11/2013 | Chistyakov ........... B23B 27/045 407/114 |

FOREIGN PATENT DOCUMENTS

| JP | 3577981 | 9/2000 |
| JP | 2004106150 A | 4/2004 |
| SE | 1150869-4 | 9/2011 |
| WO | 2009005218 A1 | 1/2009 |

* cited by examiner

*Primary Examiner* — Sunil K Singh
*Assistant Examiner* — Alan Snyder
(74) *Attorney, Agent, or Firm* — Corinne R. Gorski

(57) ABSTRACT

The present disclosure relates to a polygonal turning insert having primary cutting edges, which individually include a nose edge and two main edges, which converge toward the same. Behind the nose edge, chip-directing guide surfaces are formed, on one hand, with a breast surface included in a knob situated behind the nose edge along a bisector between the main edges, and, on the other hand, with a pair of flank surfaces included in a land there behind. At a distance behind the knob, there is formed a second breast surface, the upper part of which is situated on a higher level than the upper part of the first breast surface. In such a way, it is guaranteed that thin chips, which tend to pass or jump over the first breast surface without being affected by the same, will impinge on the second, higher breast surface and be subjected to guiding by the same.

13 Claims, 13 Drawing Sheets

POLYGONAL TURNING INSERT

RELATED APPLICATION DATA

This application claims priority under 35 U.S.C. §119 to SE Patent Application No. 1350345-3, filed on Mar. 20, 2013, which the entirety thereof is incorporated herein by reference.

TECHNICAL FIELD

The present disclosure relates to a polygonal turning insert of the type that includes an upper side, an under side, and a clearance surface between the same. A primary cutting edge is formed at least along the upper side and includes three part edges—a nose edge situated in a corner and two main edges, which converge toward the same and are individually formed between the clearance surface and a chip surface, as well as, chip-controlling guide surfaces for each one of the part edges, formed on one hand, by a first breast surface included in a knob, which is situated behind the nose edge along a bisector between the main edges, and, on the other hand, by a pair of flank surfaces, which are included in a land situated inside the chip surfaces of the main edges, and which slope toward lower boundary lines. The first breast surface is convexly arched and having an elongate, C-like contour shape with a length extension that runs transversely to the bisector. The distance between two end points determines the width of the first breast surface, besides which the angle of inclination of the first breast surface in arbitrary vertical sections through a center decreases from a greatest value in a section along the bisector to a smallest value in a section through the individual end point.

BACKGROUND

FIG. 1 generally illustrates a turning tool 1 during conventional, external machining of a workpiece 2. The tool 1 includes a holder 3, as well as, a replaceable turning insert 4 made in accordance with the present disclosure. In this case, the workpiece 2 is rotated (in the direction of rotation R) at the same time as the tool is longitudinally fed parallel to the center axis C1 of the workpiece 2, more precisely in the direction of the arrow F. The longitudinal feed per revolution is designated f, while the cutting depth is designated $a_p$. The entering angle between the direction of the longitudinal feed and a main edge included in the turning insert is designated κ. In the example shown, κ amounts to 95°.

It should furthermore be pointed out that the turning insert 4 has a rhombic basic shape and includes two acute corners having an angle of 80° and two obtuse corners having an angle of 100°. In such a way, a tool back clearance σ of 5° between the turning insert and the generated surface of the workpiece is obtained. Usually, the holder 3 is manufactured from steel and the turning insert 4 from cemented carbide or the like.

In all kinds of chip removing machining of metal, including turning, the rule applies that the chip "is born crooked", i.e., immediately after the moment of removal, the chip obtains an inherent aim to be curved. The shape of the chip, among other things its radius of curvature, is determined by several factors, the most important of which, in connection with turning, are the feeding of the tool, the rake angle of the cutting edge, the cutting depth in question, as well as the material of the workpiece. After the removal, the chip will move perpendicular to each infinitesimal part of the cutting edge. If the cutting edge is straight, the chip therefore becomes flat or cross-sectionally rectangular, but if the same is entirely or partly arched, the chip becomes cross-sectionally entirely or partly arched.

Another factor, which has bearing on the turning process, is the choice of the so-called cutting geometry of the cutting edges. Two categories of cutting edges are distinguished by those skilled in the art, on one hand, cutting edges having a positive (nominal) cutting geometry, and, on the other hand, cutting edges having a negative cutting geometry. In the first-mentioned case, a wedge angle of the cutting edge, i.e., the angle between the chip surface and the clearance surface, which together form the cutting edge, is smaller than 90° (=acute), while the wedge angle of the cutting edge in the second case amounts to 90° (or more). A crucial difference between a cutting edge having a positive cutting geometry and one having a negative is that the first-mentioned one lifts out the chip by being wedged in between the same and the generated surface, while the last-mentioned one pushes the chip in front of itself while shearing off the same. Therefore, positive cutting edges generally become more easy-cutting than negative ones, and produce chips having greater radii of curvature than chips produced by the last-mentioned ones.

In order to provide additional background of the nature of the chip produced in connection with turning, attention is directed to a metaphor, which is used by those skilled in the art to explain the fact that chips having different width/thickness have different bendability. Thus, a thin and narrow chip may be compared to a slender blade of grass, while a thick chip may be compared to a stiff reed. Similar to the blade of grass, a thin chip can without appreciable difficulty be bent if the same is brought toward an obstacle in the form of an adjacent, more or less steeply sloping guide surface, while a stiff, reed-like chip would be over broken under the same conditions; this is something that causes a high sound level, great cutting forces, a short service life of the turning insert, as well as a high generation of heat, possibly accompanied by sticking.

In connection with turning, the chip control is of large importance, not only to the machining result, but also to an efficient, problem-free operation. If the removed chip would not be guided by any guide surface or chip breaker, the same will be developed in an uncontrolled and unforeseeable way. Thus, at least thin and bendable chips may curl in long, telephone cord-like screw formations, which may impinge on and damage the generated surface of the workpiece, and—not the least—get entangled in the tool or other components included in the machine in which machining takes place. If a thick and stiff chip, on the other hand, shortly after the removal would impinge on a steeply sloping guide surface, other problems will arise, such as tendency to over breaking of the chip, extreme generation of heat, which may entail sticking, and that the turning insert becomes blunt-cutting, as well as risk of premature wearing damage in the guide surface. Therefore, an optimum, desirable chip control is obtained if the guide surface of the chip-former is situated at such a distance from the cutting edge line of the cutting edge, and at such an angle of inclination that the chip is carefully guided away, in such a way that the same can be broken into smaller fragments, e.g. by being curled or brought to impinge on the clearance surface of the turning insert and being broken into pieces against the same. Even if helicoidal chips, rather than short fragments, would be formed, it is desirable that the same have a small diameter and a limited length.

In this connection, it should be pointed out that good chip control is particularly important in modern, software-controlled turning or multi-operation machines, which are placed in sealable housings and periodically unmanned. If the chips are not divided into smaller fragments (or short screw formations), which can be carried away via a conveyor included in the machine, but rather form tangles of helicoidal chips, such may cause shutdown and serious damage to the machine.

Within the field of turning, it is desirable to be able to use one and the same turning insert for roughing, medium, and finishing operations while attaining good chip control irrespective of the cutting depth in question. For this reason, a number of different turning inserts have been developed having chip-formers, which include, on one hand, a breast surface placed behind the individual nose edge to guide such narrow chips that are formed when the cutting depth is small (finishing), and, on the other hand, two flank surfaces placed inside the chip surfaces of the main edges and having the purpose of guiding such narrow chips that are wide as a consequence of the cutting depth being large (roughing). Examples of such turning inserts are documented in U.S. Pat. No. 5,372,463, U.S. Pat. No. 5,743,681, and U.S. Pat. No. 7,374,372.

In spite of all the development attempts, the turning inserts in question have, however, a mediocre versatility with respect to the ability to guarantee good chip control under all the varying operation conditions that occur in practice. Thus, certain turning inserts may give acceptable results when the cutting depth is small and the feed moderate (=narrow and thin chip), but poor results when the cutting depth as well as the feed are increased (=wider and thicker chip). This lack of versatility becomes particularly annoying when the cutting depth varies during one and the same working operation.

In order to remedy the shortcomings of the previously known techniques, a turning insert has been developed, which is the subject of SE 1150869-4 (filed on 2011-09-23). Characteristic of this turning insert is that the same includes a knob placed closely behind the nose edge of the cutting edge and having a breast surface, and a geometrical shape described further herein. Briefly, the breast surface of the knob may be said to have a convexly arched shape and be elongate and transverse in relation to a bisector between the main edges, as well as have an inclination that is the greatest in the middle so as to then successively diminish toward those ends that are situated closest to the main edges.

Although this turning insert has given good results in many different applications, it has turned out that the chip guiding under certain conditions, for example, when the cutting depth is small (=narrow chips) and the feed large (=relatively thicker chips), has not been satisfying. Thus, such chips (above all from materials difficult to machine) have been able to pass or "jump over" the breast surface without being affected by the same. This means that the chips will not be fragmented but developed in an uncontrolled way.

SUMMARY

The present disclosure aims at further developing the turning insert disclosed in SE 1150869-4, such that the above-mentioned shortcoming is obviated. Therefore, one aspect is to form the present turning insert with chip-forming means, which not only gives a good chip control for such wide chips that are produced at greater cutting depths, but also when the turning insert works with small cutting depths. In other words, the turning insert should, in a reliable way, provide good chip control for a large number of applications, i.e., independently of the selected cutting depth and irrespective if the feed is small or large, wherein the turning insert should be capable of machining of a large number of materials, such as steel, cast iron, heat-resistant steel, yellow metals, extremely hard alloys, etc.

A further aspect is to enable manufacturing of the turning insert in a double-sided embodiment, which does not only guarantee a good, all-round chip control regardless of which one of the two identical upper and under sides of the turning insert that is used, but also facilitates the location of the active cutting edge in a position desirable from a cutting-technical point of view, for example, with the main edge horizontally oriented in relation to the workpiece, at the same time as the clearance between the workpiece and the current corner of the turning insert having a good size. It is also an aspect to provide a turning insert, the chip-forming guide surfaces of which without exception have smoothly rounded shapes, i.e., lack sharp or broken parts, all with the purpose of facilitating a problem-free, efficient turning process. A particular aspect in connection with double-sided turning inserts is to allow guiding of the chips in such a way that they do not damage such flat support surfaces that are present in the up-turned, active side of the turning insert.

According to the disclosure, at least the basic aspect is attained by the fact that, at a distance backward from the first breast surface, there is formed a second breast surface, which is convexly arched and slopes from a highest point along the bisector to two lowest end points in the direction transversely to the direction of the bisector, which are separated by a distance that defines the width of the second breast surface, more precisely a width that is smaller than the width of the first breast surface, although amounting to at least 50% of the same, the upper part of the second breast surface being situated on a higher level than the upper part of the first breast surface.

By forming, behind the first breast surface, a second breast surface, which projects higher than the first breast surface, it is guaranteed that chips that possibly pass the first breast surface without being guided by the same, will impinge on the second breast surface and be guided away by the same. By the fact that the second breast surface is given a width that amounts to at least 50% of the width of the first breast surface, a sufficiently great area of impact is afforded. By giving, on the other hand, the second breast surface a width that is smaller than the one of the first breast surface, the effect is attained that wide chips, which are removed along the individual main edge, will be guided in a careful way, because the distance of the chips from the main edge to the side portions of the breast surface will be longer than the distance up to the first (lower situated) breast surface.

In one embodiment, the first breast surface is situated with its lower boundary line at a distance along the bisector from the tip of the nose edge that is smaller than the radius of the nose edge. This means that the first breast surface is located so near the nose edge that a narrow chip will obtain a reliable guiding immediately after the moment of removal.

In yet another embodiment, a forwardly tapering ridge is included in the land, which ridge rises from a lowest point situated on a level below the upper part of the first breast surface and includes the flank surfaces situated at a distance inward from the main edges, the second breast surface being located behind a valley between the knob and the ridge. By the existence of such a valley, a passing is attained whereby the hot chip has the time to cool down before it impinges on the second breast surface.

In still another embodiment, the second breast surface may be included in a front part of a cam, which tapers in the backward direction toward a crest line, which separates two opposite flank surfaces of the land. By the fact that this cam tapers in the backward direction, the same will not detrimentally affect the guidance of wider chips, which are guided along the flank surfaces of the ridge.

In another embodiment, the chip part surfaces present outside the flank surfaces have a width that successively increases in the backward direction from the nose edge, more precisely by lower boundary lines along the flank surfaces deviating from the cutting edge lines of the turning insert. In such a way, wide chips will slide further along the chip part surface, above all adjacent to the auxiliary cutting edge, before they reach the chip-guiding, upwardly sloping flank surface.

In one embodiment as exemplified in the drawings, all part surfaces, which determine the topography of the upper side in the area of a primary cutting edge, transform into each other via smooth, convex and concave radius transitions, which give the topography of a wavy, edgeless design. In such a way, the chip guiding will be gentle although distinct for all different chip widths depending on the selected cutting depth.

In a particular embodiment, the turning insert is double-sided by including identical upper and under sides in which the lands include flat surfaces, which form support surfaces situated in reference planes, which are parallel to each other and to a neutral plane, which is situated halfway between the reference planes and toward which the clearance surface extends at a right angle; a plurality of primary cutting edges, which are formed along the upper as well as the underside and transform into auxiliary cutting edges, which run parallel to the neutral plane and separate pairs of primary cutting edges placed in corners, the individual primary cutting edge having a generally positive cutting geometry so far that a wedge angle of the cutting edge between the chip surface and the clearance surface is acute in arbitrary sections along the nose edge as well as along the two main edges. This generally positive cutting geometry along the individual primary cutting edge ensures that the turning insert becomes easy-cutting at small, as well as, providing greater cutting depths.

In the last-mentioned embodiment, the level difference between the flat support surface of the individual land and a plane common to the auxiliary cutting edges may amount to at most 0.400 mm. In such a way, it is guaranteed that the flank surfaces of the land do not form any abrupt obstacle to the chips.

In the above embodiment, the primary cutting edge may be situated in a corner plane, which is inclined in relation to the neutral plane in the direction of the respective reference plane, the individual main edge of the primary cutting edge transforming into the auxiliary cutting edge via an arched intermediate edge determining the angle between the corner plane and the neutral plane. Thereby, it is enabled that the upwardly angled corner plane (with the active primary cutting edge) can be essentially horizontally oriented in relation to the workpiece when the double-sided turning insert has been tipped into a spatial position in order to provide clearance between the workpiece and the clearance surface. In other words, negative rake angles can be avoided in the corner plane, and in such a way, the double-sided turning insert demonstrates lower cutting forces, sound, and generation of heat in the primary cutting edge.

In a further embodiment, the center of the first breast surface may be situated at a distance from the tip that is smaller than the radius of the nose edge. This means that the first breast surface is located so near the nose edge that a narrow chip will obtain a reliable guiding immediately after the moment of removal. Preferably, the highest point of the second breast surface may however be situated at a distance from the tip that is greater than said radius. This means that the second breast surface is located at such a distance from the nose edge that it in an efficient way guides such thick chips that jump over the first breast surface. In order to provide further efficient guiding of such narrow chips that are both thin and thick, the highest point of the second breast surface may be situated at a distance from the center of the first breast surface that is smaller than the distance between the center and the tip.

According to another embodiment, the center of the radius of the nose edge may thereby be situated in the valley between the knob and the ridge.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
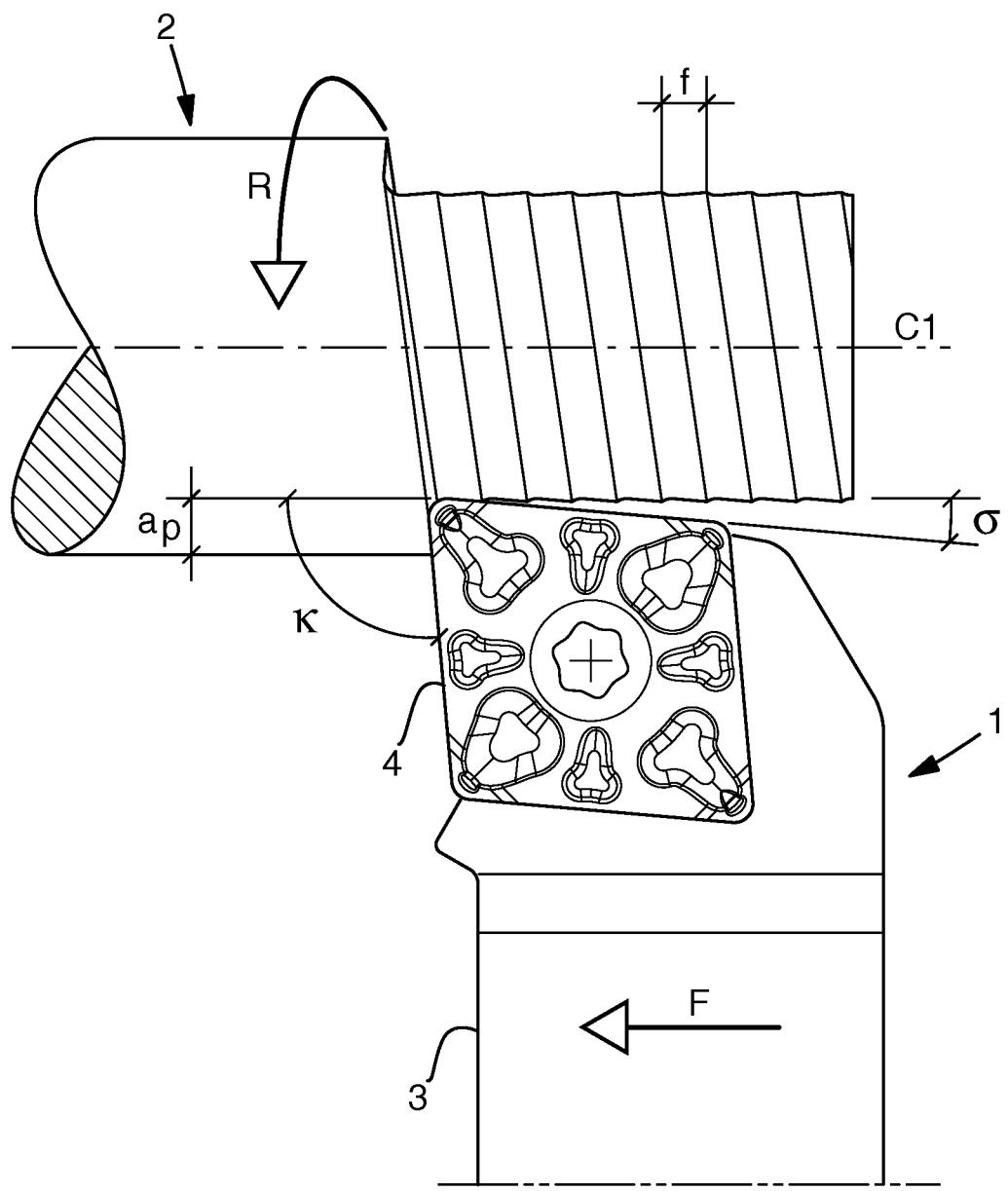
FIG. 1 is a schematic illustration of a general course of turning.
Figure 2:
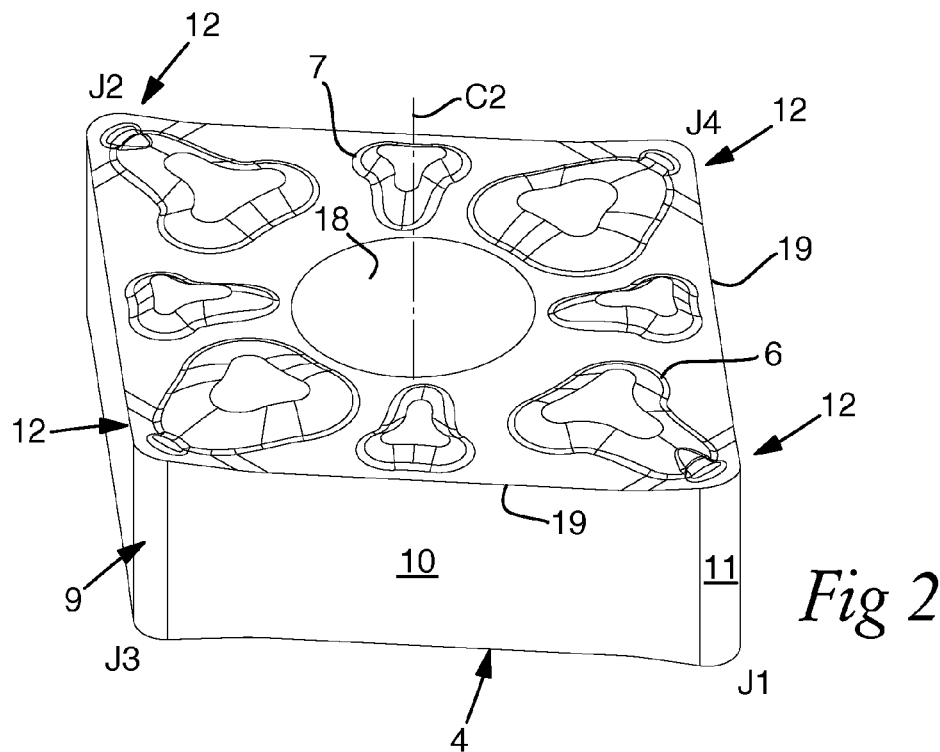
FIG. 2 is a perspective view of a turning insert according to the present disclosure.
Figure 3:
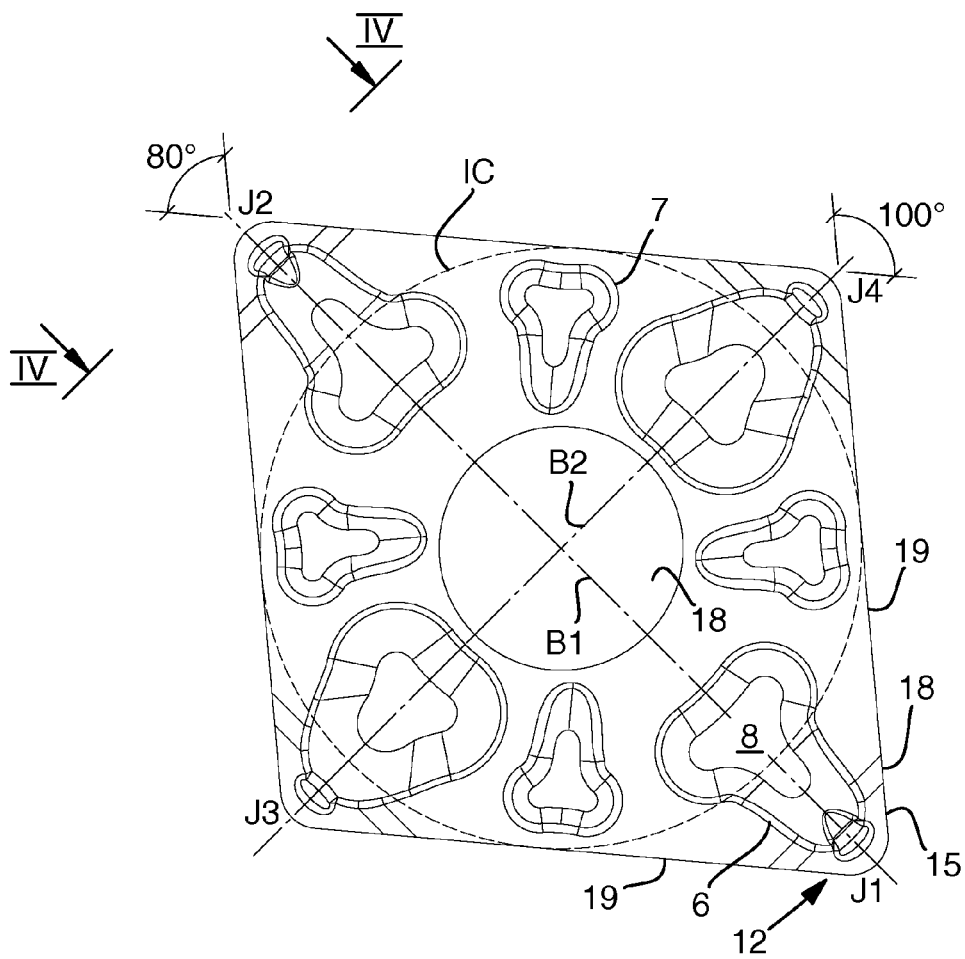
FIG. 3 is a planar view from above of the turning insert of FIG. 2.
Figure 4:
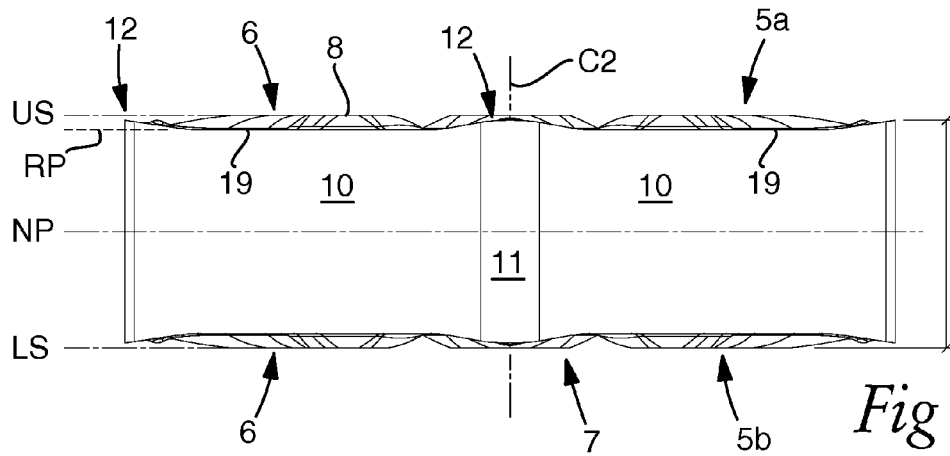
FIG. 4 is an enlarged side view of the same turning insert.

Referring to FIGS. 2-4, it is seen that the turning insert 4 has a polygonal basic shape and includes a pair of opposite upper and under sides generally designated 5a and 5b, respectively. In the shown, preferred embodiment, the turning insert is double-sided so far that the upper and under sides are identical. For this reason, only the upper side 5a will henceforth be described in detail.

Figure 26:
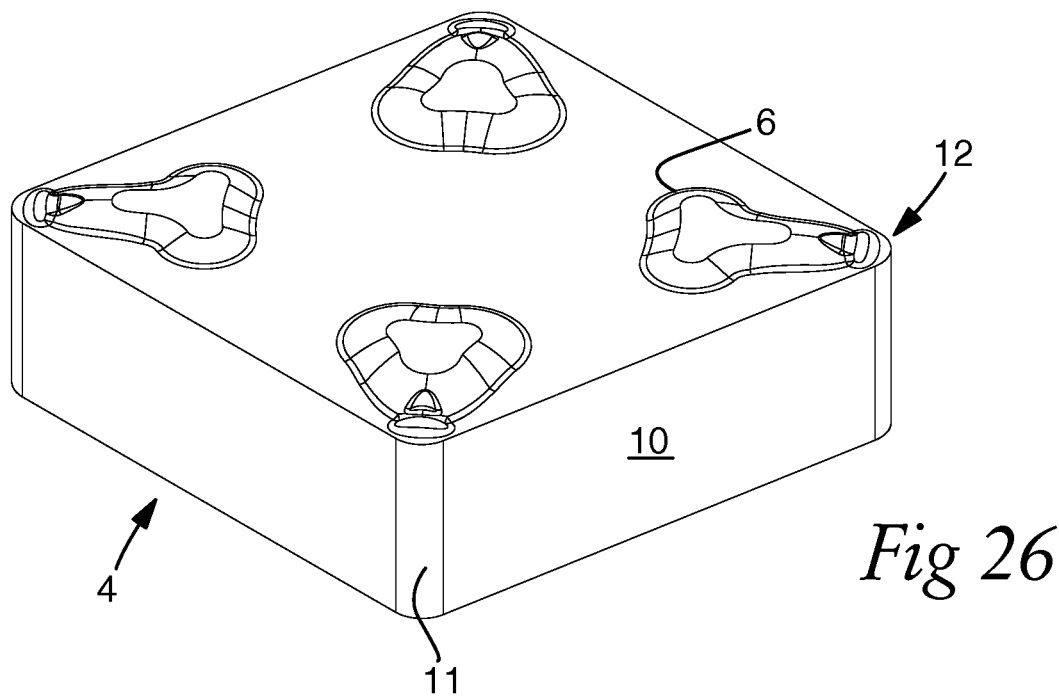
FIG. 26 is a perspective view illustrating a single-sided turning insert according to the disclosure.
Figure 27:
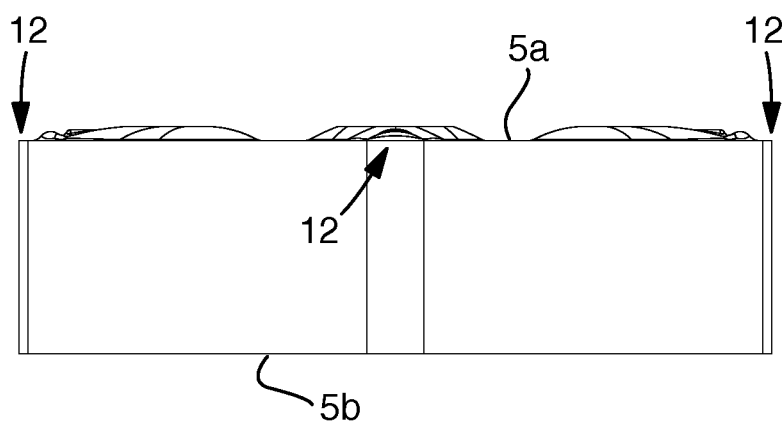
FIG. 27 is a side view of the turning insert according to FIG. 26.

It should be appreciated that although a double-sided turning insert of one type is illustrated in FIGS. 1-25, among other things, for the reason that such turning inserts have the advantage of including twice as many cutting edges as single-sided ones, this does not exclude that the disclosure is applied also to the last-mentioned type of turning inserts, as illustrated in FIGS. 26 and 27.

In the upper side 5a, in this case, there are included a plurality of mutually separated lands 6, 7, which individually include a flat surface 8, which may serve as a support surface when the turning insert is turned upside down and is applied into a seat in the tool holder 3. Of the totally eight lands, four ones, the lands 6, are located in the area of corners of the turning insert, while the lands 7 are placed approximately halfway between two corner lands 6. All support surfaces 8 along each side (5a, 5b) of the turning insert are located with their planes in a common plane US to simultaneously be able to abut against a flat bottom surface in the appurtenant seat. In the example shown, when the turning insert is double-sided, the plane US is parallel to a neutral plane NP, which is parallel to a lower plane LS and situated halfway between the planes US and LS. The geometrical features described henceforth, and which determine the shape of the turning insert, will be related to this neutral plane NP.

In the example, the turning insert is rhombic and includes four corners J1, J2, J3, and J4, which are pair-wise opposite each other. At the corners J1, J2, the turning insert is acute, while the corners J3, J4 are obtuse. Although the corner angles may vary, in this case, the acute angles are 80° and the obtuse angles 100°. Between the upper and under sides 5a, 5b, a circumferential clearance surface extends, which is generally designated 9, and which includes a plurality of part surfaces, —four flat surfaces 10 and four convex surfaces 11, which are situated in the corners and form round transitions between adjacent surfaces 10. In FIG. 3, B1 designates a bisector of the acute-angled corners J1, J2, while B2 designates a bisector of the obtuse-angled corners J3, J4. An inscribed circle of the type that traditionally is used to size classify turning inserts is designated IC. In practice, the IC measure of turning inserts of the kind in question may be within the range of 6-25 mm. The thickness t of the turning insert (see FIG. 4), such as this is defined as the axial distance (the level difference) between the lower plane LS and a cutting tip S (see FIG. 5) along the upper side 5a, is usually considerably smaller than the IC measure. In a prototype embodiment, which forms the basis of the drawing figures, the IC measure amounts to 12,7 mm and the thickness t to 4,76 mm.

Along the individual upper and under side, respectively, two pairs of cutting edges are formed, two diametrically opposed cutting edges 12, which are situated in the acute corners J1, J2 along the common bisector B1, as well as a pair of likewise diametrically opposed cutting edges 12, which are situated in the area of the obtuse corners J3, J4, more precisely along the bisector B2. Of these cutting edges 12, primarily the ones situated along the bisector B1 are of interest in the context of the invention. Although all cutting edges are usable, per se, only the last-mentioned ones can be used in one and the same tool holder 3, while the other two require another type of holder (for other operations). For this reason, only the cutting edges 12 along the bisector B1 will be described more in detail.

Figure 5:
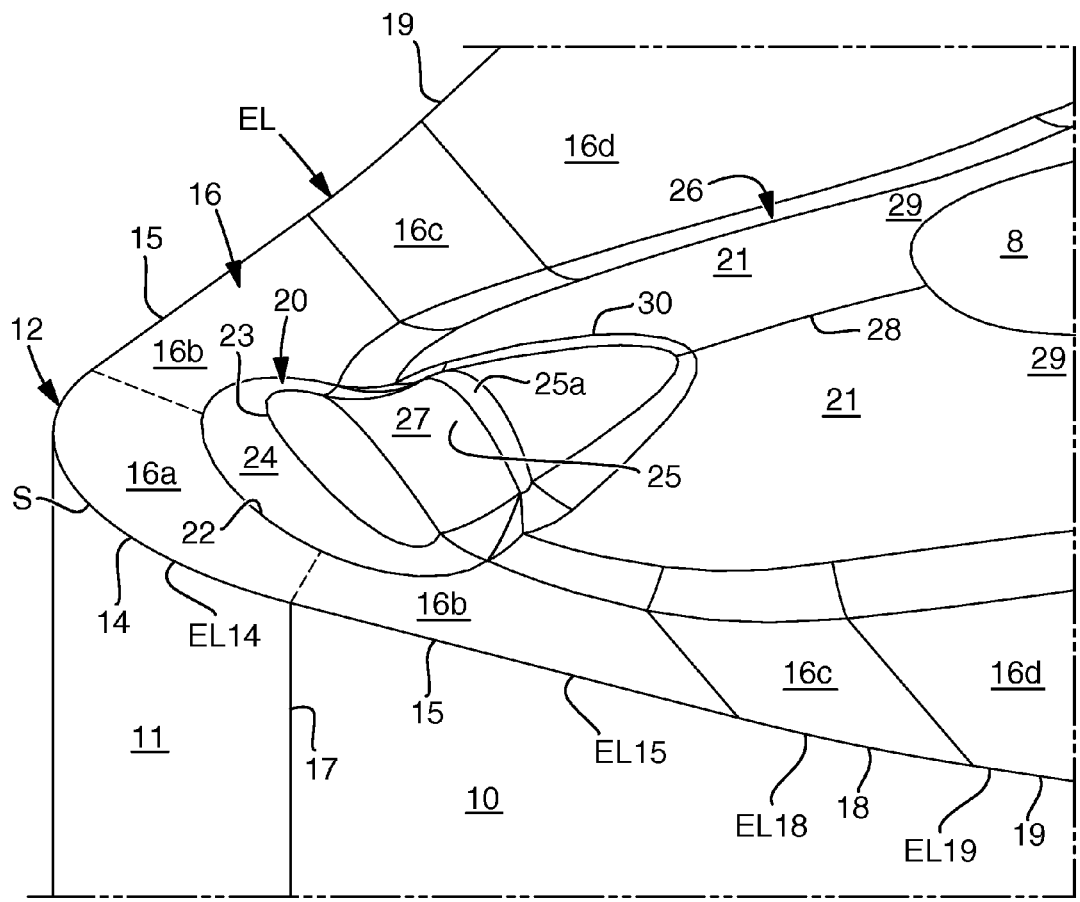
FIG. 5 is an enlarged top view showing the design of the turning insert adjacent to a corner.
Figure 6:
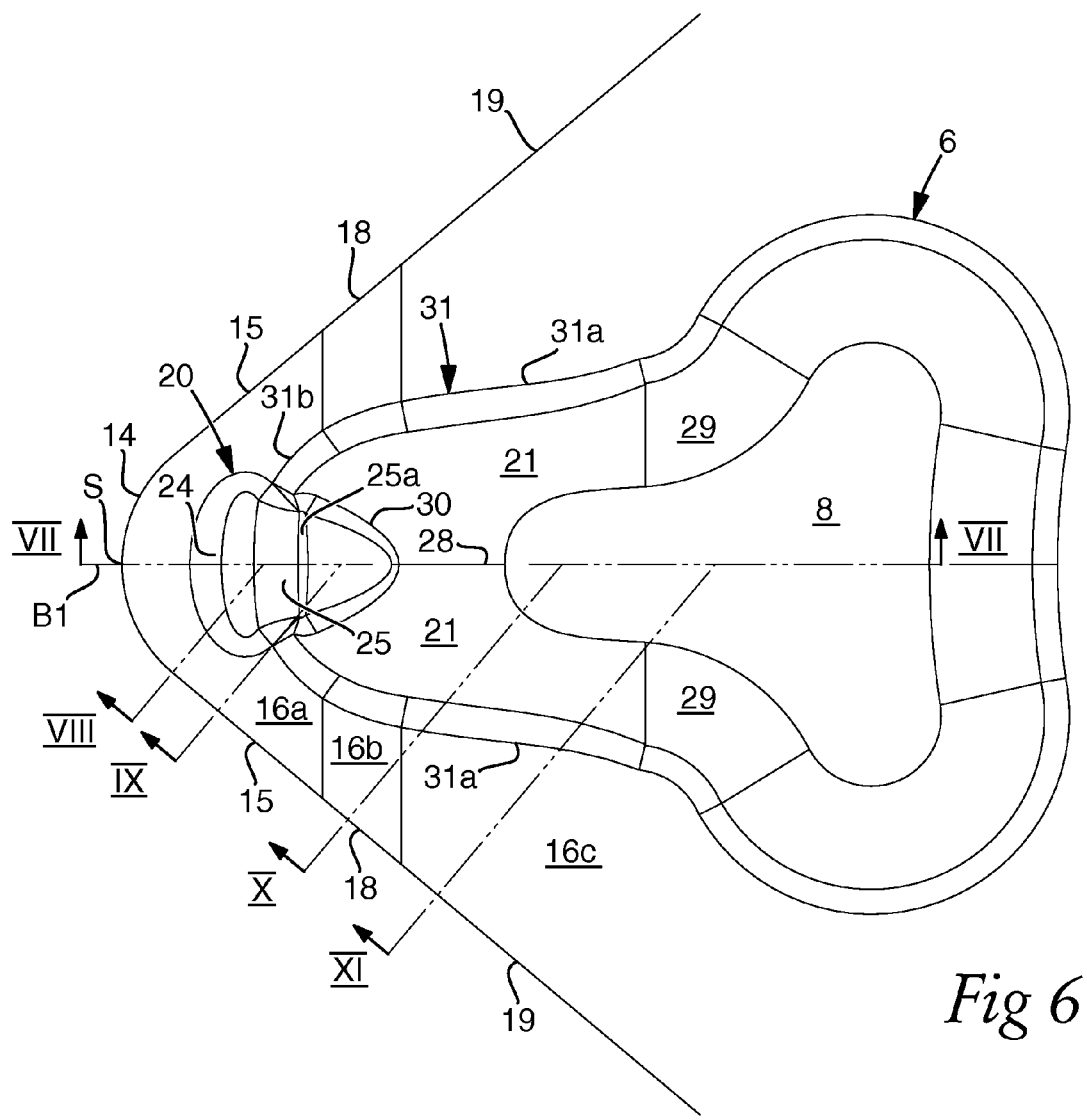
FIG. 6 is a schematic, sectioned planar view from above of the same corner as shown in FIG. 5.
Figure 7:
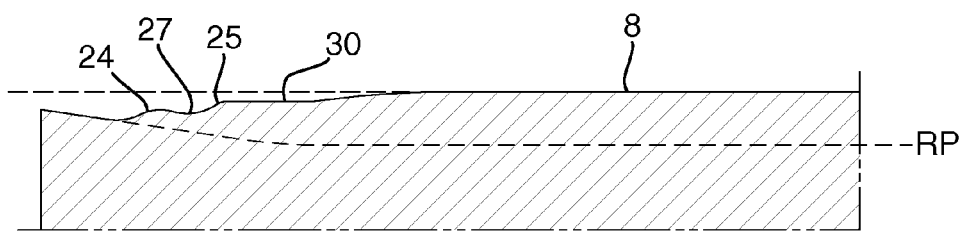
FIG. 7 is a cross-section taken along line VII-VII of FIG. 6.
Figure 8:
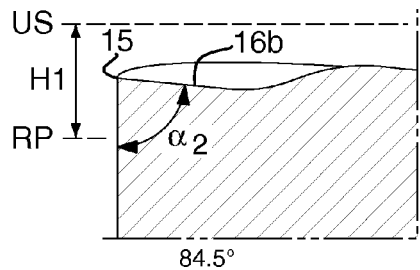
FIG. 8 is a cross-section showing the cutting edge angle of the primary cutting edge taken along line VIII-VIII of FIG. 6.
Figure 9:
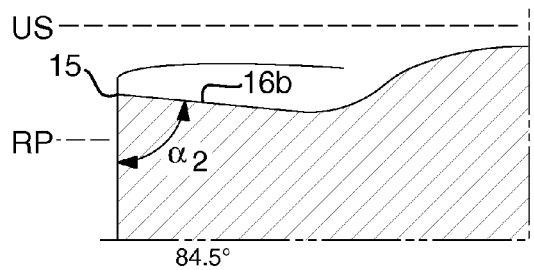
FIG. 9 is a cross-section showing the cutting edge angle of the primary cutting edge taken along line IX-IX of FIG. 6.
Figure 10:
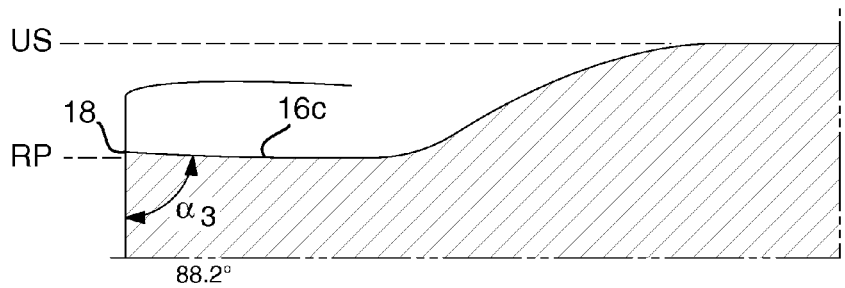
FIG. 10 is a cross-section showing the cutting edge angle of the primary cutting edge taken along line X-X of FIG. 6.
Figure 11:
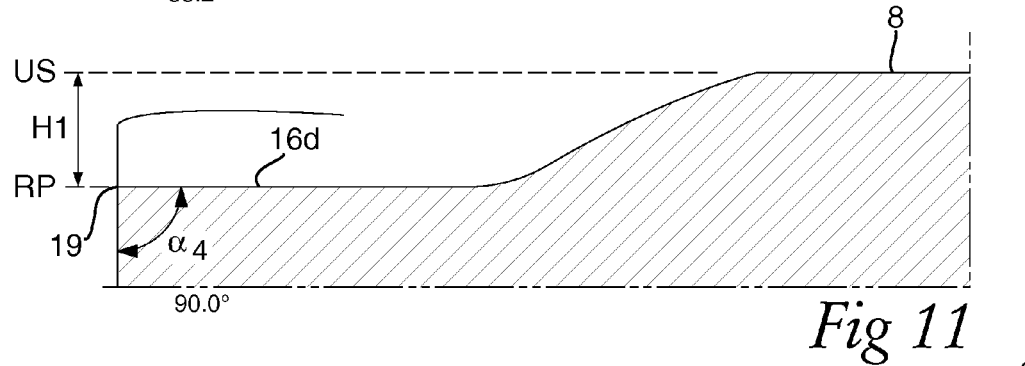
FIG. 11 is a cross-section showing the cutting edge angle of the primary cutting edge taken along line XI-XI of FIG. 6.

As a matter of form, it should be pointed out that the present cutting edges 12 henceforth will be denominated "primary cutting edges". As seen in FIGS. 5 and 6, the primary cutting edge 12 includes three part edges, —a nose edge 14 situated in a corner, as well as, two main edges 15, which converge toward the same and are individually formed between a chip surface in its entirety designated 16 and the different part surfaces 10, 11 of the clearance surface 9. More precisely, the nose and main edges 14, 15 are formed adjacent to chip part surfaces 16a and 16b, respectively. Of the clearance part surfaces, the surfaces 10 are flat, and therefore the individual main edge 15 becomes straight as viewed in plane elevation, while the part surface 11 is convexly arched, e.g., partially cylindrical, whereby the nose edge 14 becomes arched, e.g., partially circular. The convex clearance part surface 11 of the nose edge 14 transforms into the flat clearance part surfaces 10 via vertical boundary lines 17. In FIG. 5, EL generally designates a circumferential cutting edge line.

The chip surface in its entirety designated 16 includes a plurality of part surfaces, —a first chip part surface 16a along the nose edge 14, two chip part surfaces 16b adjacent to the main edges 15, two chip part surfaces 16c adjacent to transition edges 18, as well as, two chip part surfaces 16d along auxiliary cutting edges 19.

At medium-sized cutting depths (1-2 mm), the principal chip removal is effected by the individual main edge 15, while the nose edge 14 has the purpose of, on one hand, operating alone at small cutting depths (0.5-0.8 mm), and, on the other hand, wiping off the generated surface of the workpiece regardless of which one of the two main edges 15 is actively chip removing.

In FIGS. 2 and 3, it is seen that the turning insert 4 includes a central, through hole 18, the center axis of which is designated C2. This hole is intended for the receipt of a screw for the fixation of the turning insert in the seat of the tool holder. The center axis C2 also defines a geometrical center of the turning insert in its entirety. It is axiomatic that the two corners J1 and J2 are equidistantly separated from the center axis C2. Also the radial distances from the center axis C2 to the two corners J3, J4 are equally large, although smaller than the distances to the corners J1, J2. In this connection, it should be mentioned that the turning insert also may be fixed by means of other means than exactly screws, e.g., clamps or levers. In such cases, the turning insert is manufactured without holes.

The two main edges 15, which together with the nose edge 14 form the individual primary cutting edge 12, are situated in a common plane CP (see FIG. 18), which in the shown, preferred embodiment is inclined in relation to the neutral plane NP. Plane CP will henceforth be denominated "corner plane." The inclination of the corner plane is a consequence of the individual main edge 15 transforming into a straight auxiliary cutting edge 19 via a slightly arched transition edge or intermediate edge 18, the (large) radius of which determines the angle between the nose plane and the neutral plane NP. When the cutting edges 15, 18, 19 are regarded in plane elevation (e.g., according to FIG. 3 or 6), their individual cutting edge lines follow a common, straight line, because the same border on the flat (and in FIGS. 2-6 vertical) clearance part surface 10. As viewed from the side, however, the intermediate edge 18 is arched as a consequence of a chip part surface 16c being inside being slightly arched, at the same time as the cutting edge lines EL15 and EL19, respectively, of the main edge 15 as well as of the auxiliary cutting edge 19 are straight as a consequence of the chip part surfaces 16b and 16d being flat. In this connection, it should be pointed out that the different chip part surfaces 16a, 16b, 16c, and 16d are shown separated from each other by means of construction lines, which only have the purpose of providing understanding of the existence of the part surfaces. In practice, however, the part surfaces in question are included in a single continuous and smooth chip surface, in which they cannot be perceived by the naked eye.

The four auxiliary cutting edges 19 run parallel to the neutral plane NP and are situated in a common reference plane RP (see FIGS. 7-12), which is countersunk in relation to the plane US (or LS) common to the support surfaces 8. The level difference between planes US, RP is seen best in FIG. 12, where the same is designated H1. For each primary cutting edge 12, chip-forming means are arranged in accordance with the invention. These means include a knob 20, of the type that is the subject of SE 1150869-4, as well as two flank surfaces 21 being behind and included in the land 6.

Figure 13:
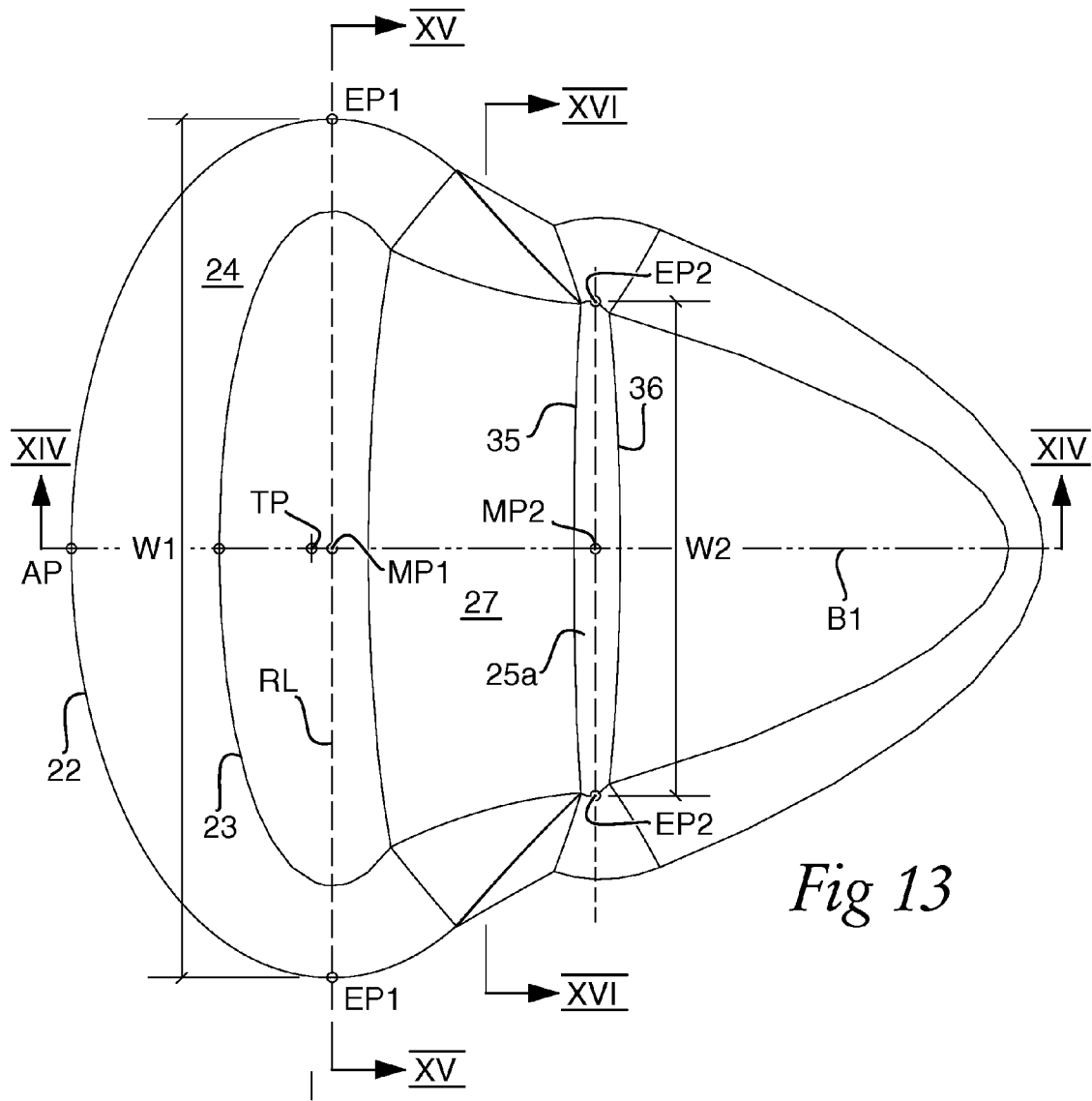
FIG. 13 is an extremely enlarged schematic planar view showing geometrical data of the two breast surfaces in the area of the corner.

Also the shape of the knob 20 is made clear by means of imaginary construction lines, —a lower boundary line 22 and an upper line 23 (see FIGS. 5 and 13). Of these, the lower line 22 marks where the knob begins to rise in relation to the surrounding chip part surfaces 16a, 16b, while the upper line 23 distinguishes a lower part of the knob from an upper one. From the enlarged geometry illustrations in FIGS. 13 and 14, it is seen that a forward/downwardly sloping breast surface 24 is included in a transition between the upper and lower parts of the knob. Said breast surface 24 is generally elongate and has a convexly arched shape. The elongate extension is transverse in relation to the bisector B1, more precisely so far that the arched, lower boundary line 22 has an apex point AP situated along the bisector B1 and includes two mirror-symmetrical arc part lines, which extend from the apex point AP to a pair of opposite end points EP1 situated along a straight reference line RL, which intersects the bisector at a right angle in a middle point MP1 between the end points EP1. The distance between the end points EP1, which determines the width of the breast surface (and of the knob), is greater than the distance between the points MP1 and AP.

In the shown, preferred embodiment, the breast surface 24 has even such a great width that also the distance between the center MP1 and the individual end point EP1 is somewhat greater than the distance between MP1 and AP. Another feature of the breast surface 24 is that the angle of inclination $\beta_1$ thereof, in arbitrary vertical sections through the center MP1, decreases from a greatest value in a section along the bisector B1 to a smallest value in a section through the individual end point EP1. In other words, the inclination becomes flatter and flatter in the direction from AP toward EP1. By this shape of the knob and the breast surface thereof, it is gained that a relatively wide and stiff chip, which primarily is removed along the main edge 15, and possibly its extension in the cutting edges 18 and 19, will be subjected to a cautious guiding when the same successively slides up along the side of the knob. In order to counteract over breaking of such chips, the upper part or crown of the knob 20 has in addition a moderate height above the surrounding chip surface. The two-dimensional arched shape of the knob 20 may also be described as the radius of curvature $r_1$ laterally of the knob (see FIG. 15) being greater than the radius $r_2$ along the bisector (see FIG. 14).

During the development work that forms the basis of the disclosure, it has occured that the knob 20 and the breast surface 24 thereof did not always have the desired chip guiding ability for such narrow chips that are produced when the cutting depth is small and the feed relatively large, i.e., narrow and thick chips. Thus, such chips have tended to pass ("jump over") the breast surface without the same having been able to guide the same in the desired direction. In order to obviate this risk, the turning insert according to the invention has also been formed with a second breast surface 25 (see FIGS. 5 and 6), which is situated at a certain distance behind the first breast surface 24, and has its upper part situated on a higher level than the upper part of the first breast surface. In the shown, preferred embodiment, the knob 20 and the land 6 are integrated via a ridge, which in its entirety is designated 26 and rises from a lowest end in a valley 27 (see also FIG. 12) situated on a level below the crown of the knob 20, to a highest end on a level with the upper support surface 8 of the land 6. The ridge 26 is primarily delimited by the aforementioned flank surfaces 21, which extend downward from a collective crest line 28 as well as in the forward extension of the flank surfaces 29 (see FIG. 6) that delimit the land 6 in other respects. The second breast surface 25 is included in a cam 30, which is formed on the ridge 26 (see FIGS. 5 and 6) and tapers in the backward direction toward the crest line 28.

It should also be noted that the rear part of the land 6 has a bicycle saddle-like contour shape. The rear, wide segment of the support surface 8 will therefore give a good support laterally.

Figure 12:
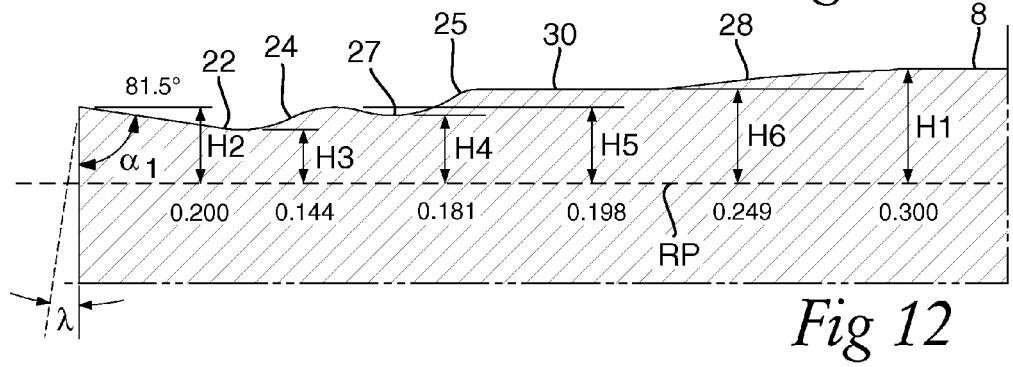
FIG. 12 is a cross-section corresponding to FIG. 7, although enlarged, showing level differences between different details included in the upper side of the turning insert.

Reference is now made to FIG. 12, which illustrates the level differences between the surface portions that determine the topography of the upper side of the turning insert adjacent to the individual corners J1, J2. In the previously mentioned prototype embodiment (IC=12.7 mm and t=4.76 mm), the level difference H1 between the support surface 8 of the land 6 and the reference plane RP amounts to 0.300 mm, and the level difference H2 between the cutting tip S of the nose edge 14 and RP to 0.200 mm. The corresponding level differences between RP and, in turn, the boundary line 22 (situated in a hollow between the breast surface 24 and the chip part surface 16a), the lowest point of the ridge 26 (situated in the valley 27 between the back side of the knob 20 and the second breast surface 25), the crown of the knob 20, and the crest of the cam 30, are designated H3, H4, H5, and H6, respectively. In the prototype embodiment, H3 amounts to 0.144 mm, H4 to 0.181 mm, H5 to 0.198 mm, and H6 to 0.249 mm. Hence it follows that the second, rear breast surface 25 projects 0.051 mm (0.249-0.198) higher than the first, front breast surface 24. Narrow chips, which pass the front breast surface 24 without being subjected to distinct guiding, will therefore with greater certainty impinge on the projecting second breast surface 25 and be guided sideward by the same.

Like the first breast surface 24, the second breast surface 25 has a generally elongate and convexly arched shape, as well as is transverse in relation to the bisector B1. The shape and situation of the second breast surface 25 are seen in more detail in FIGS. 13-17. As may be best seen in FIGS. 13 and 14, the breast surface 25 extends downward/forward from a long narrow transition surface 25a (so-called radius transition), which is delimited between two boundary lines 35, 36. The transition surface extends between two end points EP2, between which there is a center MP2, which, like MP1, is located along the bisector B1. The distance between the end points EP2 defines the width of the second breast surface, which is designated W2. The general angle of inclination $\beta_2$ of the second breast surface 25 is, in the example, somewhat greater than the angle of inclination $\beta_1$ of the first breast surface 24. In the example, $\beta_2$ amounts accordingly to 34° and $\beta_1$ to 27°.

Figure 14:
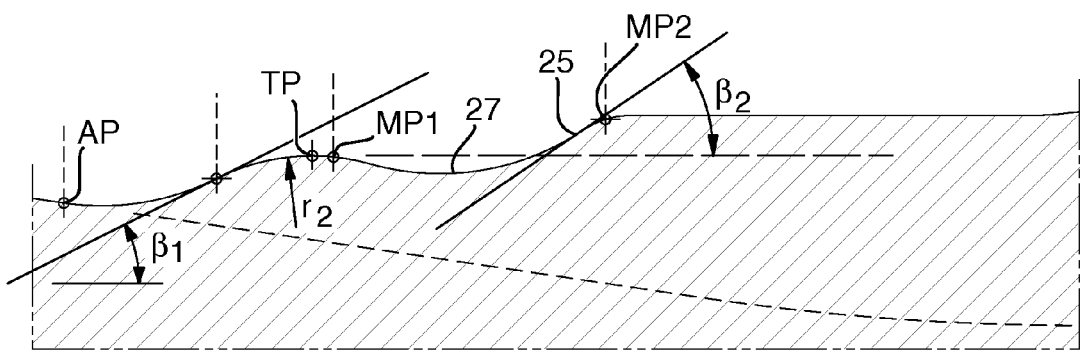
FIG. 14 is a longitudinal cross-section taken along line XIV-XIV of FIG. 13.

With continued reference to FIGS. 13 and 14, it should—as a matter of Form—be pointed out that the highest point TP of the crown of the knob 20 is situated somewhat in front of the cross section XV-XV that runs between the two end points EP1 that determine the width W1 of the breast surface 24.

Figure 15:
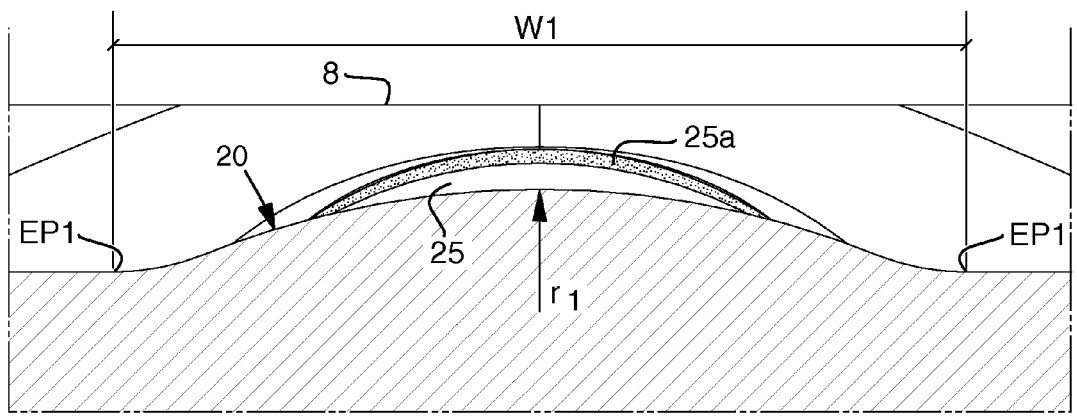
FIG. 15 is an enlarged cross-section taken along line XV-XV of FIG. 13.

In FIG. 15, it is shown how the crown of the knob 20 has a successively flatter shape from the middle of the crown toward the end points EP1. In the intermediate area, the crown has (and thereby the first breast surface 24) accordingly a comparatively great radius of curvature, which is designated $r_1$. As clearly seen in FIG. 15, the second breast surface 25 is behind and the transition surface 25a thereof projects in relation to the first breast surface (0.051 mm according to the preceding example).

Figure 16:
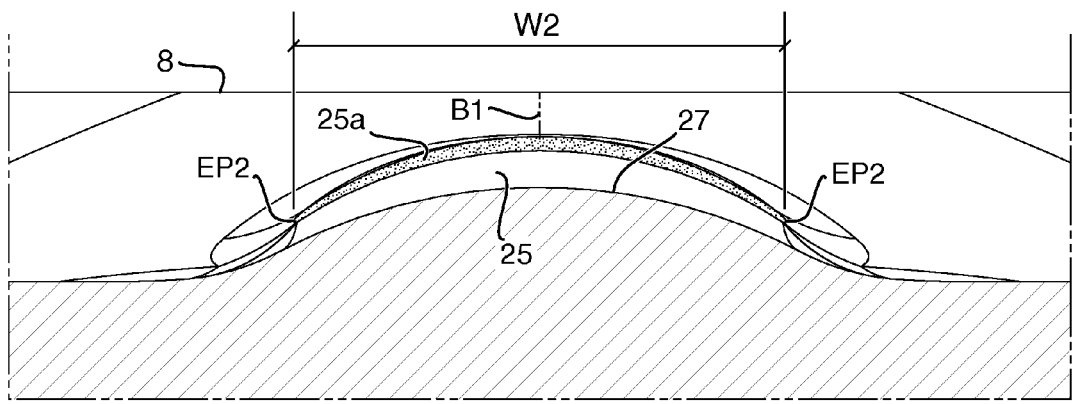
FIG. 16 is an analogous cross-section taken along line XVI-XVI of FIG. 13.

In FIG. 16 (see the cross-section along XVI-XVI in FIG. 13), there is shown, on one hand, how the upper part 25a of the second breast surface 25 is situated on a considerably higher level than the lowest level of the valley 27 along the bisector B1, and, on the other hand, how the width W2 of the second breast surface 25 is smaller than the width W1 of the first breast surface. In the example, W1 amounts to 1.0 mm, and W2 to 0.6 mm. The width W2 may vary upward as well as downward from the last-mentioned value. However, W2 should amount to at least 50% of W1.

Figure 17:
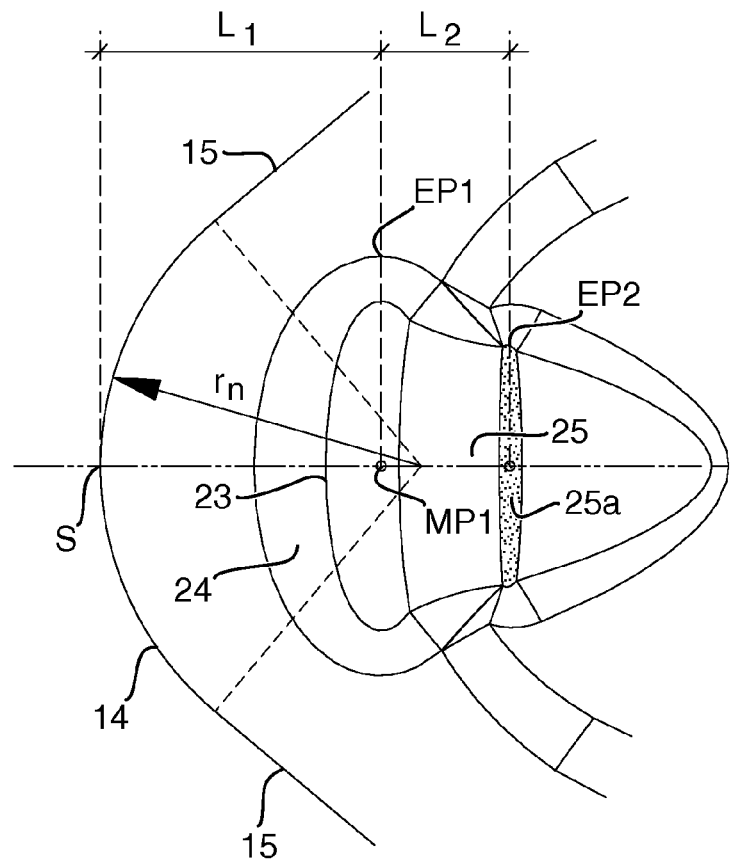
FIG. 17 is a detailed planar view illustrating the location of the two breast surfaces in relation to the nose edge of the primary cutting edge.
Figure 18:
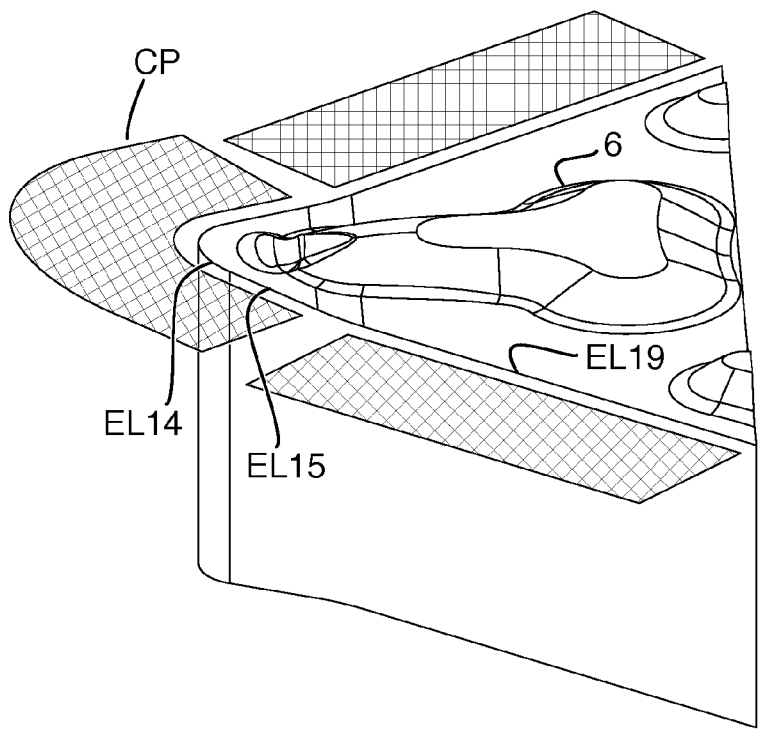
FIG. 18 is a partial top view showing how the primary cutting edge is angled in relation to the neutral plane of the turning insert.
Figure 19:
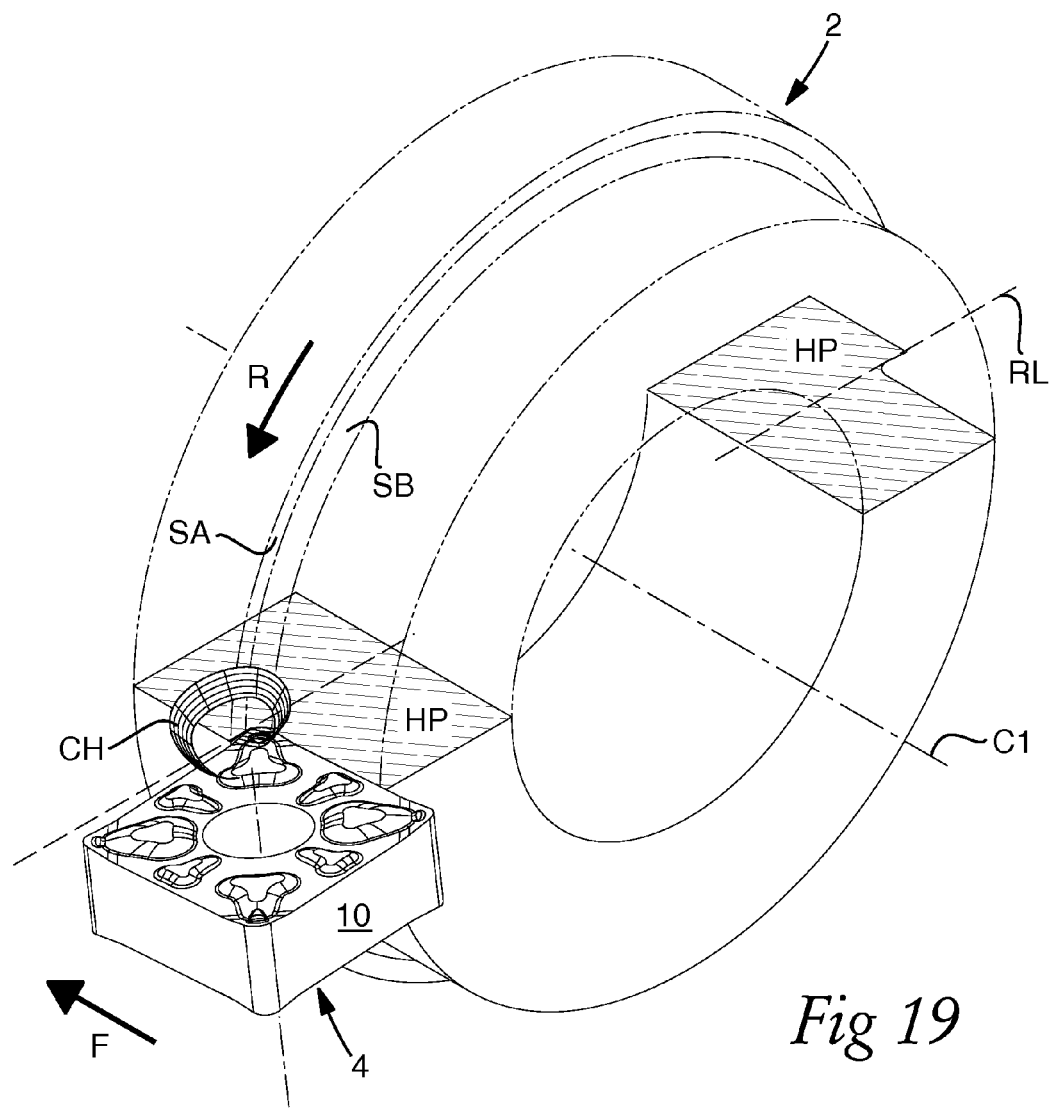
FIG. 19 is a partial cross-sectional perspective view showing a tubular work piece, as well as, a turning insert of the present disclosure during machining of the same.
Figure 20:
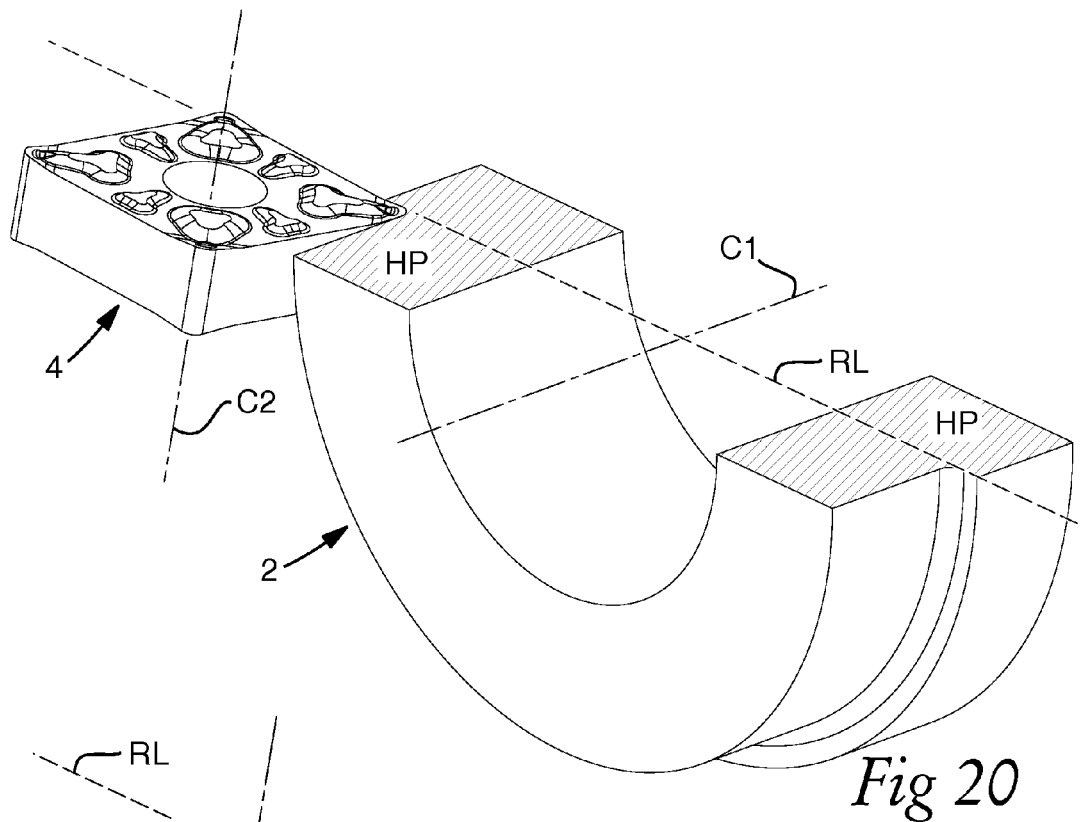
FIG. 20 is a similar perspective view from another sighting point showing the engagement of the turning insert in the workpiece during turning.
Figure 21:
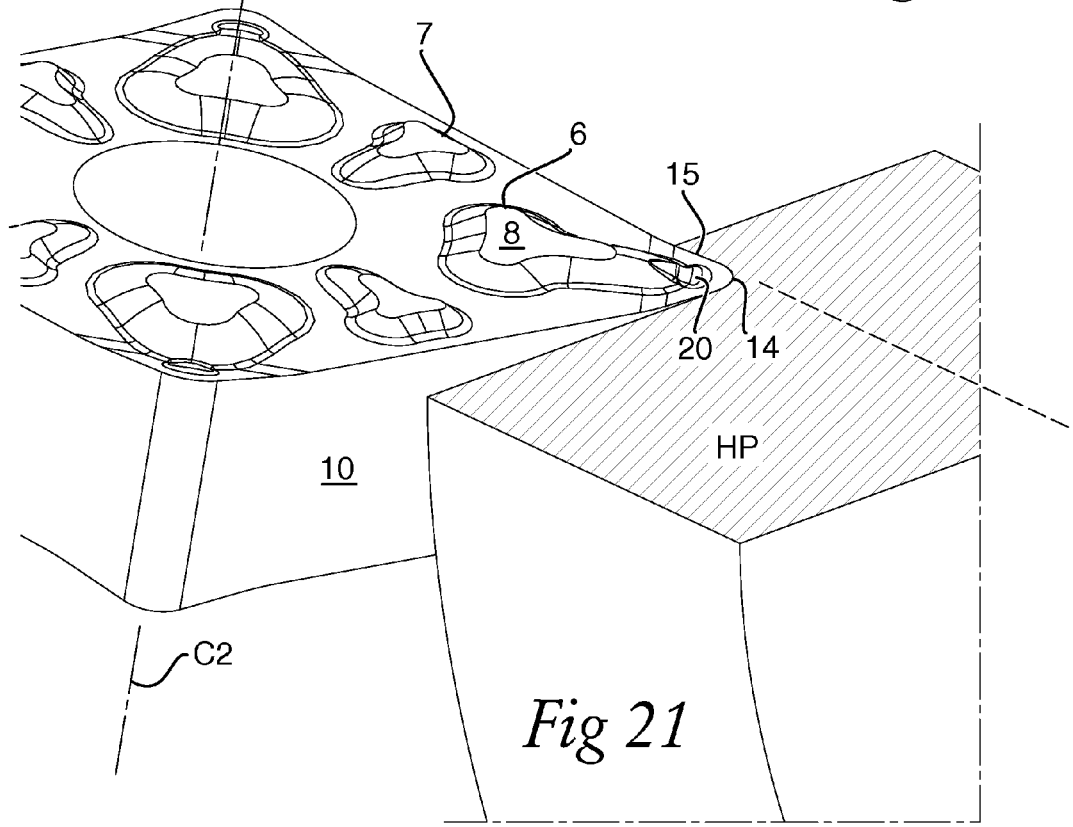
FIG. 21 is a further enlarged perspective view showing the same engagement as in FIG. 20.

In FIG. 17, the situation of the two breast surfaces 24, 25 in relation to the nose edge 14 is illustrated. In the example, the corner radius $r_n$ amounts to 0.8 mm, a sector inside the nose edge 14 having an arc angle of 100° (180°–80°). As clearly seen in FIG. 17, the radial distance between the cutting tip S and the center MP1 is smaller than the radius $r_n$. In the example, L1 accordingly amounts to approx. 0.7 mm. In other words, the first breast surface 24 is situated near the nose edge 15 in order to be quickly hit by a narrow chip of the type that primarily is removed only along the nose edge 15. Furthermore, the second breast surface 25 is in turn situated near the front breast surface 24 so far that the distance L2 is smaller than L1. In the example, L2 amounts to 0.3 mm, i.e., less than half the measure L1. In this connection, it should also be pointed out that the second breast surface 25 (see FIG. 6) is situated at a significant distance in front of the front part of the flat support surface 8. Thus, the last-mentioned distance is somewhat greater than the distance (L1+L2) between the cutting tip S and the second breast surface 25. Chips that obtain guiding by either the first breast surface 24 or, at all events, the breast surface 25 being behind, will therefore be guided sideward in good time before they reach up to the support surface 8. In other words, the chips are guided sideward without being able to damage the support surface 8 (which will not be utilized until after inversion of the turning insert).

In FIGS. 6-12, it is seen that the wedge angle of the cutting edge $\alpha_1$ in the cross-section along VII-VII amounts to 81.5° (the complementary angle of which amounts to 8.5°). In the example, the chip part surface 16a is in the form of a flat surface (could also be slightly arched). This means that the angle of inclination of the corner plane CP (see also FIG. 18) in relation to the reference plane RP (as well as the neutral plane NP) amounts to 8.5°. From the cross-section VII, the wedge angle of the cutting edge $\alpha_1$ increases toward the cross-section VIII-VIII, more precisely to a value $\alpha_2$ of 84.5°. This angle is constant along the entire main edge 15 (see FIGS. 8 and 9). Along the intermediate edge 18, which is situated along the arched chip part surface 16b, the wedge angle of the cutting edge $\alpha_3$ increases successively from 84.5° to 90° in the segment where the intermediate edge 18 transforms into the auxiliary cutting edge 19 (see FIG. 11). In the example, the wedge angle of the cutting edge $\alpha_4$ is constantly 90° along the entire auxiliary cutting edge 19, involving that the same, per se, has a negative cutting geometry, but thereby also a considerably greater strength than the cutting edges 14, 15, 18.

To explain the function of the turning insert according to disclosure, reference is made to FIGS. 19-25, FIG. 19 of which illustrates a workpiece 2, which is rotated on a center axis C1, which is contained in a horizontal plane indicated by HP. The machining of the workpiece is carried out by means of the turning insert 4, which during its longitudinal feed in the direction of the arrow F produces a chip designated CH. During the turning, the turning insert 4 is (via the appurtenant holder 3 according to FIG. 1) tipped-in in a spatial position in which the two straight main edges 15 of the primary cutting edge 12, more precisely the cutting edge lines EL15 thereof, are located in the horizontal plane HP. In the example, the main edge affords a positive cutting geometry. Simultaneously, the clearance surface 9 (which is perpendicular to NP, but angled in relation to the chip part surface 16b) of the turning insert, will clear from the ring-shaped surfaces SA (flat) and SB (concave) that are subjected to machining. If $\alpha_1$ in the cross-section VII-VII (see FIG. 12) amounts to 81.5°, the clearance angle $\lambda$ (see FIG. 25) between the concave surface SB and the clearance part surface 11 of the turning insert at the nose will amount to 90−81.5=8.5°. A corresponding clearance (not shown) is obtained also in relation to the flat surface SA, more precisely at a clearance angle that is a complementary angle to the wedge angle of the cutting edge in the cross-section IX-IX (FIG. 9), i.e., in the example 90−84.5=5.5°.

Figure 22:
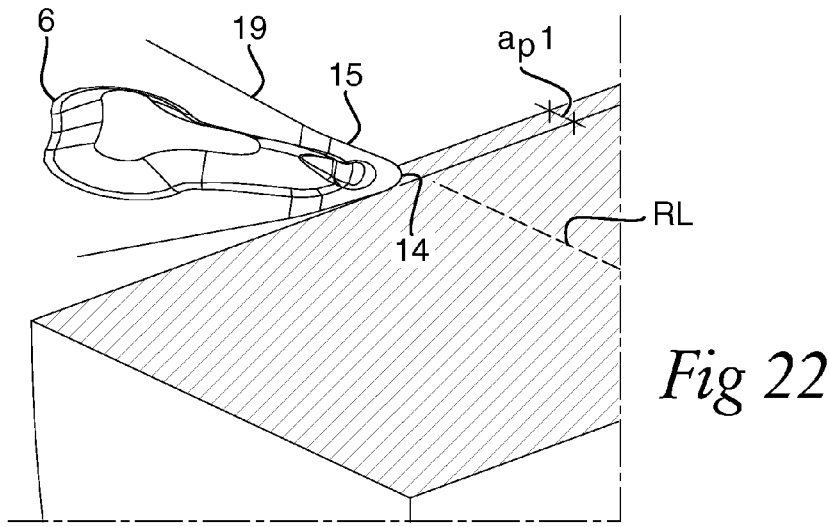
FIGS. 22-24 are cut perspective views showing the turning insert during turning at different cutting depths.
Figure 23:
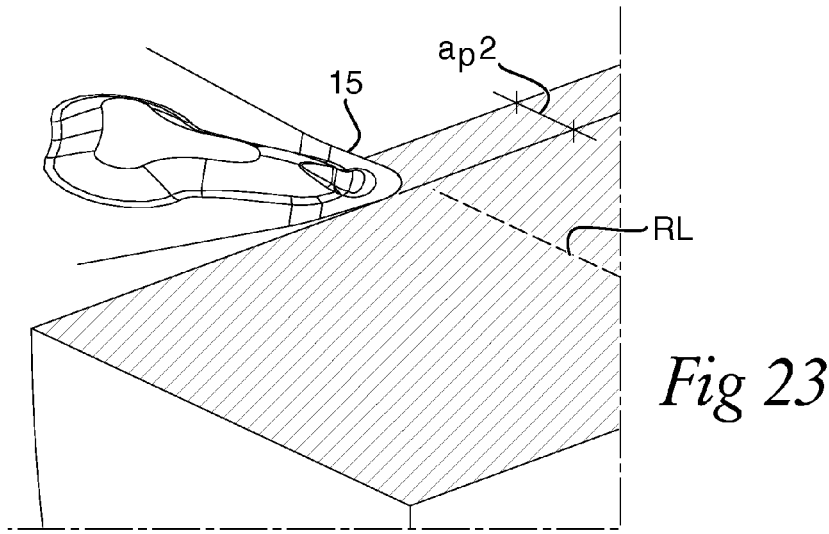
Figure 24:
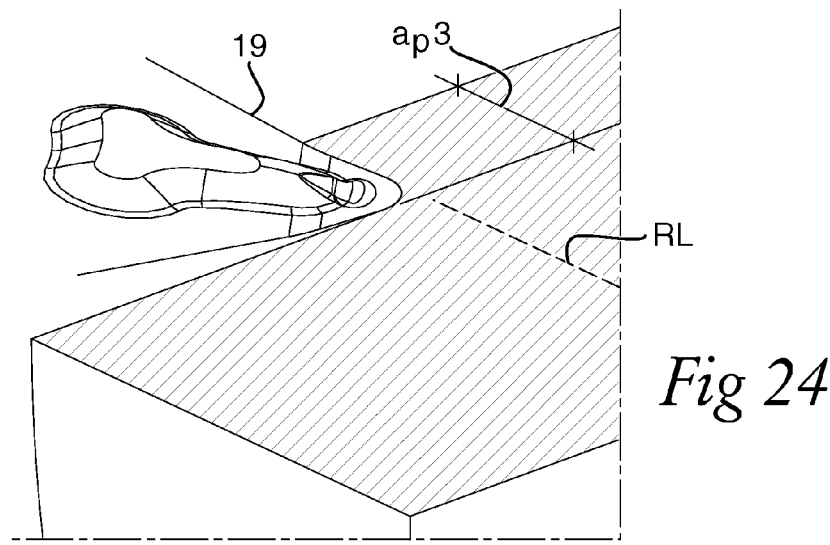
Figure 25:
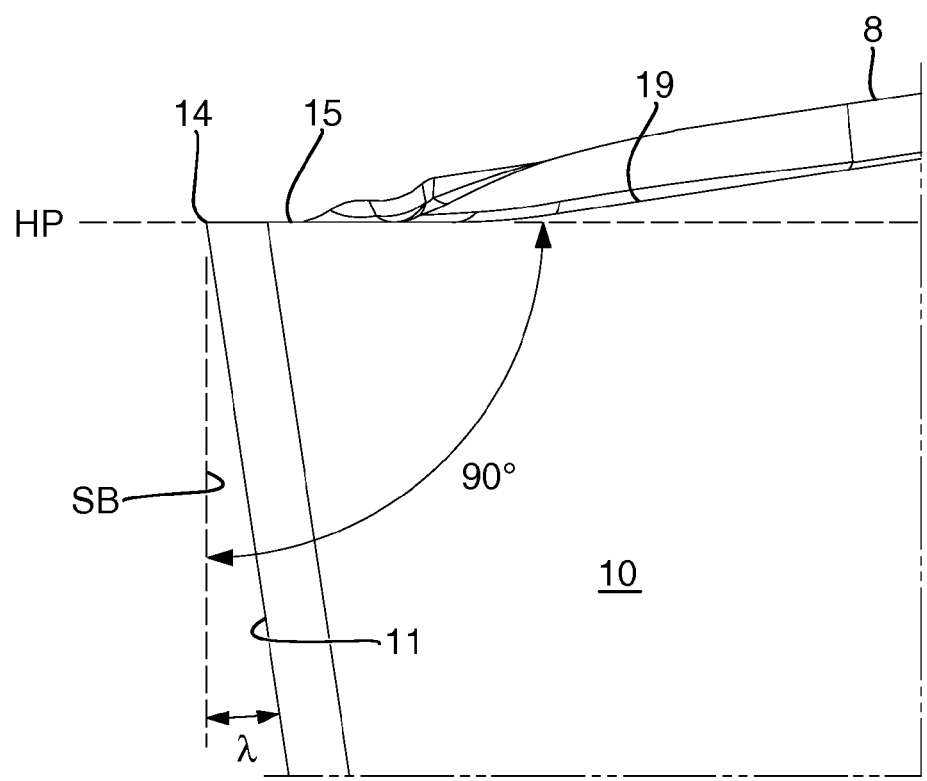
FIG. 25 is an enlarged detailed view showing the clearance of the turning insert in a corner.

In FIGS. 22-24, it is shown how the turning is carried out at different cutting depths $a_p$. In FIG. 22, the cutting depth $a_p1$ is minimal, e.g., in the order of 0.5-0.8 mm. In this connection, the chip removal is essentially made only along the nose edge 14 (which in the example has a radius of 0.8 mm). Because of the principle that infinitesimal parts of the chip are directed perpendicular to the cutting edge, the chip will in this case become cross-sectionally arched and obtain a chip flow direction at a very moderate angle to the bisector B1. After the moment of removal, the chip follows the chip part surface 16a so as to after a short time (cf. the distance L1) impinge on the front breast surface 24 of the knob 20. If the chip peradventure would not be subjected to desired guiding by means of said breast surface 24, the same will run further rearward so as to then impinge on the rear breast surface 25 situated higher, which with greater reliability guides away the chip sideward (in the way indicated in FIG. 19). In such a way, the chip will be broken into pieces or fragmented by, for instance, diving in against the chip surface by the side of or behind the land 6 or against the connecting clearance surface 9 of the turning insert.

In the examples according to FIGS. 23 and 24, the cutting depths $a_p2$ and $a_p3$ are greater. This means on one hand that a major part of the chip will be removed along the straight main edge 15, and to a varying extent also the cutting edges 18 and 19, and on the other hand that the chip flow direction is changed and forms an increasing angle to the bisector B1 as the cutting depth increases. In addition, the chip becomes flat or rectangular in the major part of its cross-section, however with the exception of a slender (frayed) edge portion having a bent shape produced by the nose edge 14. This means that a part of the chip increasing with the cutting depth will impinge on and be guided by the flank surface 21. If not only the cutting depth but also the feed has been increased, the stiffness of the chip has now become considerably greater than in the first example (cf. reed/blade of grass). In spite of the increased stiffness, however, the chip will be guided in a gentle, although distinct way, above all as a consequence of the perpendicular distance from the cutting edge line up to the flank surface 21 increasing with increasing cutting depth, but also as a consequence of the flank surface 21 as well as the side surfaces of the knob 20 and cam 30 being flat, i.e., rising at moderate pitch angles. The knob 20 is the highest in the point TP and declines successively toward the end points EP. For this reason, these surfaces do not afford any abrupt obstacles against which the thicker chip could be broken over. In this connection, it should particularly be emphasized that neither do the cam 30 and the second breast surface 25 included in the same contribute to any risk of over breaking, in spite of the second breast surface 25 projecting higher (0.051 mm) than the first breast surface 24, more precisely as a consequence of the cam being situated at a greater lateral distance from the straight cutting edge line along the flat clearance part surface 10, and the flank surfaces thereof sloping flatly downward from the highest crest of the cam. In addition, the second breast surface 25 has a limited width W2. Moreover, of some significance is the fact that the flank surfaces 21 have a height of at most 0.400 mm, suitably at most 0.300 mm, as in the example according to FIG. 12.

A fundamental advantage is that the chip-guiding capacity of the turning insert will be good and reliable during all the varying conditions that may occur in practical production, such as varying cutting depths, varying feed, and machining of different materials (the inherent properties of which may give the chip a most varying character, e.g., in respect of the radii of curvature). In particular, the chip formation at small cutting depths will be essentially improved, without because of this the chip formation at large cutting depths being detrimentally affected.

Reference is now made to FIGS. 26 and 27, which illustrate single-sided turning inserts. Thus, the same turning insert has a flat under side 5b and an upper side 5a having four primary cutting edges 12 placed in corners, which co-operate with chip-directing guide surfaces being behind of the type that has been described above. In respect of the definitions of the geometrical design of the cutting edges and chip-forming means, in this case, the flat under side 5b forms a basal reference plane, instead of the previously used neutral plane NP.

The invention is not limited to the embodiments described above and shown in the drawings. Thus, the chip-directing guide surfaces of the chip-forming means may be modified in various ways. For instance, the front knob, which includes the breast surface intended foremost for thin chips, may be separated from the part of the land being behind that includes the flank surfaces that have the purpose of guiding wider and stiffer chips. It is also feasible to form said flank surfaces on other, projecting members than such lands that simultaneously include a support surface. Furthermore, it is possible to apply the invention to turning inserts having another basic shape than tetragonal, e.g., triangular. It should also be mentioned that the auxiliary cutting edge of the turning insert, which is situated on a moderate level below the plane in which the support surfaces are located, also may be slightly cambered instead of absolutely straight. It is also feasible to form the auxiliary cutting edge with a moderate, positive cutting geometry, e.g., having the shape of a wedge angle of the cutting edge within the range of 87-90°.

Although the present embodiments have been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A polygonal turning insert comprising:
an upper side, an under side, and a clearance surface disposed between the same;
a primary cutting edge is formed at least along the upper side and includes three part edges, including a nose edge situated in a corner and two main edges, which converge toward the same and are individually formed between the clearance surface and a chip surface; and
chip-controlling guide surfaces for each one of the part edges, are formed by a first breast surface included in a knob situated behind the nose edge along a bisector between the main edges, by a pair of flank surfaces included in a land situated inside the chip surfaces of the main edges, and which slope toward lower boundary lines, the first breast surface being convexly arched and having an elongate, C-like contour shape with a length extension that runs transversely to said bisector and the distance between two end points determining a width of the first breast surface, besides which an angle of inclination of the first breast surface in arbitrary vertical sections through a center decreases from a greatest value in a section along the bisector to a smallest value in a section through an individual end point, wherein at a distance backward from said first breast surface, there is formed a second breast surface, which is convexly arched and slopes from a highest point along the bisector to two lowest end points in a direction transverse to the direction of the bisector, which are separated by a distance that defines a width of the second breast surface that is smaller than the width of the first breast surface and being at least 50% of the same, an upper part of the second breast surface being situated on a higher level than an upper part of the first breast surface.

2. The turning insert according to claim 1, wherein the first breast surface is situated with lower boundary line thereof at a distance along the bisector from a tip of the nose edge that is smaller than a radius of the nose edge.

3. The turning insert according to claim 1, wherein, in said land, a forwardly tapering ridge is included, said ridge rising from a lowest point situated on a level below the upper part of the first breast surface, and including the flank surfaces situated at a distance inward from said main edges, the second breast surface being located behind a valley between the knob and the ridge.

4. The turning insert according to claim 1, wherein the second breast surface is included in a front part of a cam, which tapers in the backward direction toward a crest line, which separates said flank surfaces.

5. The turning insert according to claim 1, wherein chip part surfaces disposed outside the flank surfaces have a width that successively increases in the backward direction from the nose edge, lower boundary lines disposed along the flank surfaces deviating from a cutting edge line of the turning insert.

6. The turning insert according to claim 1, wherein all part surfaces, which determine a topography of an upper side in an area of the primary cutting edge, transform into each other via smooth, convex and concave radius transitions, which give the topography a wavy, edgeless design.

7. The turning insert according to claim 1, wherein the insert is double-sided by including identical upper and under sides, the lands including flat surfaces, which form support surfaces situated in reference planes, which are parallel to each other and to a neutral plane, which is situated halfway between the reference planes and toward which the clearance surface extends at a right angle; a plurality of primary cutting edges, which are formed along the upper and under sides and transform into auxiliary cutting edges, which run parallel to the neutral plane and separate pairs of primary cutting edges placed in corners, each individual primary cutting edge having a generally positive cutting geometry, such that a wedge angle of the cutting edge formed between the chip surface and the clearance surface is acute in arbitrary sections along the nose edge and along the two main edges.

8. The turning insert according to claim 7, wherein a level difference between the flat support surface of an individual land and a plane common to the auxiliary cutting edges is at most 0.400 mm.

9. The turning insert according to claim 7, wherein the primary cutting edge is situated in a corner plane, which is inclined in relation to the neutral plane in the direction of the respective reference plane, each main edge of the primary cutting edge transforming into the auxiliary cutting edge via an arched intermediate edge that determines the angle between the corner plane and the neutral plane.

10. The turning insert according to claim 2, wherein a center of the first breast surface is situated at a distance from the tip that is smaller than the radius.

11. The turning insert according to claim 10, wherein the highest point of the second breast surface is situated at a distance from the tip that is greater than the radius.

12. The turning insert according to claim 2, wherein the highest point of the second breast surface is situated at a distance from a center of the first breast surface that is smaller than a distance between the center and the tip.

13. The turning insert according to claim 3, wherein a center of the radius of the nose edge is situated in the valley.

* * * * *